(12) United States Patent
Gao et al.

(10) Patent No.: US 10,146,796 B2
(45) Date of Patent: Dec. 4, 2018

(54) METHOD AND APPARATUS FOR PHOTOGRAPH CLASSIFICATION AND STORAGE

(71) Applicant: Baidu Online Network Technology (Beijing) Co., Ltd., Beijing (CN)

(72) Inventors: Haoyuan Gao, Beijing (CN); Xi Wu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/900,098

(22) PCT Filed: Jan. 14, 2015

(86) PCT No.: PCT/CN2015/070675
§ 371 (c)(1),
(2) Date: Dec. 18, 2015

(87) PCT Pub. No.: WO2016/023336
PCT Pub. Date: Feb. 18, 2016

(65) Prior Publication Data
US 2017/0154054 A1  Jun. 1, 2017

(30) Foreign Application Priority Data

Aug. 15, 2014  (CN) .......................... 2014 1 0403833

(51) Int. Cl.
*G06F 7/00* (2006.01)
*G06F 17/30* (2006.01)

(52) U.S. Cl.
CPC .... *G06F 17/30256* (2013.01); *G06F 17/3028* (2013.01); *G06F 17/30115* (2013.01); *G06F 17/30268* (2013.01)

(58) Field of Classification Search
CPC ......... G06F 17/30256; G06F 17/30268; G06F 17/3028; G06F 17/30115
(Continued)

(56) References Cited

U.S. PATENT DOCUMENTS 8,526,742 B2   9/2013 Kuriyama
2003/0072486 A1* 4/2003 Loui ...................... G06T 11/60
                                                        382/175
(Continued)

FOREIGN PATENT DOCUMENTS

CN   101587485 A   11/2009
CN   102265598 A   11/2011
(Continued)

OTHER PUBLICATIONS

International Search Report and Written Opinion of the International Searching Authority dated May 19, 2015 for International Application No. PCT/CN2015/070675 in 18 pages (English translation in 12 pages).

(Continued)

*Primary Examiner* — Binh V Ho
(74) *Attorney, Agent, or Firm* — Knobbe Martens Olson & Bear LLP

(57) ABSTRACT

A method and an apparatus for photograph classification and storage by matching an image characteristic of a first photograph with an image characteristic of a second photograph in a directory, and calculating the similarity between the first photograph and the second photograph and presenting the first photograph and the second photograph in a front-end page as located in a same subdirectory when the similarity between the first photograph and the second photograph is larger than a preset threshold. The beneficial effects being that a number of similar images in a user's photo album can be sorted efficiently and placed into the same directory to (Continued)

facilitate the user's management and viewing of the photographs.

8 Claims, 2 Drawing Sheets

(58) Field of Classification Search
USPC .......................................................... 707/737
See application file for complete search history.

(56) References Cited

U.S. PATENT DOCUMENTS

| | | | |
|---|---|---|---|
| 2003/0198390 A1* | 10/2003 | Loui | G06F 17/3025 |
| | | | 382/224 |
| 2004/0024758 A1* | 2/2004 | Iwasaki | G06F 17/30277 |
| 2004/0267740 A1* | 12/2004 | Liu | G06F 17/30256 |
| 2005/0084155 A1* | 4/2005 | Yumoto | G06K 9/00087 |
| | | | 382/190 |
| 2006/0074771 A1* | 4/2006 | Kim | G06F 17/30256 |
| | | | 705/26.1 |
| 2008/0088698 A1* | 4/2008 | Patel | H04N 7/15 |
| | | | 348/14.09 |
| 2009/0297032 A1* | 12/2009 | Loui | G06F 17/30256 |
| | | | 382/195 |
| 2010/0302429 A1* | 12/2010 | Sakakima | H04N 1/00005 |
| | | | 348/333.05 |
| 2011/0205399 A1* | 8/2011 | Gao | G06F 17/30056 |
| | | | 348/231.99 |
| 2011/0280447 A1* | 11/2011 | Conwell | G06F 17/30265 |
| | | | 382/103 |
| 2012/0002878 A1* | 1/2012 | Kuriyama | G06K 9/00221 |
| | | | 382/195 |
| 2012/0020576 A1* | 1/2012 | Fry | G06F 17/30265 |
| | | | 382/218 |
| 2012/0076427 A1* | 3/2012 | Hibino | G06K 9/00671 |
| | | | 382/218 |
| 2013/0041889 A1 | 2/2013 | Gotoh et al. | |
| 2014/0075296 A1* | 3/2014 | Schaad | G06F 17/2229 |
| | | | 715/243 |
| 2014/0126830 A1* | 5/2014 | Suganuma | G06K 9/627 |
| | | | 382/225 |

FOREIGN PATENT DOCUMENTS

| | | |
|---|---|---|
| CN | 102393907 A | 3/2012 |
| CN | 103177102 A | 6/2013 |
| WO | 2014107954 | 7/2014 |

OTHER PUBLICATIONS

Oliva, A., et. al., "Modeling the Shape of the Scene: A Holistic Representation of the Spatial Envelope," International Journal of Computer Vision 42(3), 145-175, 2001, downloaded from http://people.csail.mit.edu/torralba/code/spatialenvelope/.

"Image and Video Retrieval," 5th International Conference, CIVR 2006, Tempe, AZ, USA, Jul. 13-15, 2006 Proceedings, p. 277, edited by Hari Sundaram, Milind Naphade, John Smith, Yong Rui.

Natsev, A., et al., "Learning the Semantics of Multimedia Queries and Concepts from a Small Number of Examples," Multimedia '05 Proceedings of the 13th annual ACM international conference on Multimedia, 598-607, 2005.

* cited by examiner

METHOD AND APPARATUS FOR PHOTOGRAPH CLASSIFICATION AND STORAGE

CROSS REFERENCE TO RELATED APPLICATIONS

This application is the U.S. National Phase Application under 35 U.S.C. § 371 of International Application No. PCT/CN2015/070675, filed Jan. 14, 2015, designating the U.S., which claims the benefit of Chinese Patent Application No. 201410403833.2, filed Aug. 15, 2014. Any and all applications for which a foreign or a domestic priority is claimed is/are identified in the Application Data Sheet filed herewith and is/are hereby incorporated by reference in their entirety under 37 C.F.R. § 1.57.

FIELD

This application relates to a method and an apparatus for photograph classification and storage, and particularly to a method and an apparatus for automatically organizing photographs according to their similarity.

BACKGROUND

With the development of cameras and smart terminals, there is a growing number of personal photographs. While photographing, people usually tend to take multiple photographs in identical or similar scenes, and select among them a relatively satisfying photograph.

However, in existing albums, photographs are usually arranged in a given sequence based on the sizes or the photograph time of, or the persons in the photographs. Accordingly, a large number of redundant photographs are shown on the same page, causing much inconvenience to a user when viewing and managing the photographs.

SUMMARY

One objective of the present invention is to provide a method and an apparatus for photograph classification and storage.

In order to achieve the above objective of the present invention, an embodiment of the present invention provides a method for photograph classification and storage, which comprises:
  obtaining photograph time information of a photograph currently being uploaded;
  extracting an image characteristic of the uploaded photograph;
  matching the image characteristic of the uploaded photograph with an image characteristic of an existing photograph whose photograph time is within a preset range from the photograph time of the uploaded photograph;
  calculating a similarity between the uploaded photograph and the existing photograph; and
  storing the uploaded photograph and the existing photograph that is identical or similar to the uploaded photograph in a same independent set, and/or marking the uploaded photograph and the existing photograph that is identical or similar to the uploaded photograph as a same independent set.

As a further embodiment of the present invention, the calculating the similarity between the uploaded photograph and the existing photograph comprises:
  calculating an image distance between the uploaded photograph and the existing photograph, and adjusting a weight of the image distance based on a photograph time interval between the uploaded photograph and the existing photograph to obtain a composite image distance, wherein a larger composite image distance indicates a lower image similarity and a smaller composite image distance indicates a higher image similarity.

As a further embodiment of the present invention, the calculating the similarity between the uploaded photograph and the existing photograph further comprises:
  increasing the weight of the image distance to increase the composite distance of the uploaded photograph and the existing photograph if the photograph time interval between the uploaded photograph and the existing photograph is long; and
  reducing the weight of the image distance to decrease the composite distance of the uploaded photograph and the existing photograph if the photograph time interval between the uploaded photograph and the existing photograph is comparatively short.

As a further embodiment of the present invention, the method further includes:
  determining an image quality of the photographs in a same set and selecting a photograph with the highest image quality as a set cover or a part of the set cover, wherein the determining comprises:
  providing scores to the photographs in the set using a deep neural network training;
  selecting the photograph with the highest or the lowest score as the photograph with the highest image quality; and
  using the selected photograph as the set cover or a part of the set cover.

In order to achieve the above objective of the present invention, the embodiment of the present invention provides a method for photograph classification and storage, which comprises:
  matching an image characteristic of a first photograph with an image characteristic of a second photograph in a directory;
  calculating a similarity between the first photograph and the second photograph; and
  presenting the first photograph and the second photograph in a front-end page as being located in a same subdirectory when the similarity between the first photograph and the second photograph is larger than a preset threshold.

As a further embodiment of the present invention, the matching the image characteristic of the first photograph with the image characteristic of the second photograph in the directory comprises:
  obtaining photograph time of photographs within the directory; and
  matching the image characteristic of the first photograph with the image characteristic of the second photograph in the directory whose photograph time is within a preset range from the photograph time of the first photograph.

As a further embodiment of the present invention, the calculating the similarity between the first photograph and the second photograph comprises:
  calculating an image distance between the first photograph and the second photograph, and adjusting a weight of the image distance based on a photograph time interval between the first photograph and the second photograph to obtain a composite image distance, wherein a larger composite image distance indicates a lower image similarity and a smaller composite image distance indicates a higher image similarity.

As a further embodiment of the present invention, the calculating the similarity between the first photograph and the second photograph further comprises:

increasing the weight of the image distance to increase the composite distance of the first photograph and the second photograph if the photograph time interval between the first photograph and the second photograph is longer than a first preset time; and reducing the weight of the image distance to decrease the composite distance of the first photograph and the second photograph if the photograph time interval between the first photograph and the second photograph is shorter than a second preset time.

As a further embodiment of the present invention, the method further includes:

determining an image quality of the photographs in a same set and selecting the photograph with the highest quality as a set cover or a part of the set cover, wherein the determining comprises:

providing scores to the photographs in the same set using a deep neural network training;

selecting the photograph with the highest or the lowest score as the photograph with the highest image quality; and using the selected photograph as the set cover or a part of the set cover.

In order to achieve the above objective of the present invention, the embodiment of the present invention provides a photograph classification and storage apparatus, which comprises:

a photograph information obtaining module configured to obtain photograph time information of a photograph currently being uploaded;

a calculation module configured to extract an image characteristic of the uploaded photograph, compare the image characteristic of the uploaded photograph with an image characteristic of an existing photograph whose photograph time is within a preset range from the photograph time of the uploaded photograph, and calculate a similarity between the uploaded photograph and the existing photograph;

a processing module configured to store the uploaded photograph and the existing photograph that is identical or similar to the uploaded photograph in a same independent set, and/or mark the uploaded photograph and the existing photograph that is identical or similar to the uploaded photograph as a same independent set.

As a further embodiment of the present invention, the calculation module is configured to:

calculate an image distance between the uploaded photograph and the existing photograph, and adjusting a weight of the image distance based on a photograph time interval between the uploaded photograph and the existing photograph to obtain a composite image distance, wherein a larger composite image distance indicates a lower image similarity and a smaller composite image distance indicates a higher image similarity.

As a further embodiment of the present invention, the calculation module is further configured to:

increase the weight of the image distance to increase the composite distance of the uploaded photograph and the existing photograph if the photograph time interval between the uploaded photograph and the existing photograph is long;

decrease the weight of the image distance to decrease the composite distance of the uploaded photograph and the existing photograph if the photograph time interval between the uploaded photograph and the existing photograph is comparatively short.

As a further embodiment of the present invention, the calculation module is further configured to determine an image quality of the photographs in a same set;

the processing module is further configured to select a photograph with the highest quality as a set cover or a part of the set cover;

the apparatus further comprises a learning module configured to perform a deep neural network training such that the learning module and the calculation module cooperatively score the photographs in the same set;

the processing module is configured to select the photograph with the highest or the lowest score as the photograph with the highest image quality and use the selected photograph as the set cover or the part of the set cover.

In order to achieve the above objective of the present invention, the embodiment of the present invention provides a photograph classification and storage apparatus, which comprises:

a calculation module configured to compare an image characteristic of a first photograph with an image characteristic of a second photograph in a directory and calculate a similarity of the first photograph A and the second photograph;

a processing module configured to present the first photograph and the second photograph in a front-end page as being located in a same subdirectory when the similarity between the first photograph and the second photograph is larger than a preset threshold.

As a further embodiment of the present invention, the apparatus further includes photograph information obtaining module configured to obtain photograph time of photographs in the directory, wherein the calculation module is configured to compare the image characteristic of the first photograph with the image characteristic of the second photograph in the directory whose photograph time is within a preset range from the photograph time of the first photograph.

As a further embodiment of the present invention, the calculation module is further configured to:

calculate an image distance between the first photograph and the second photograph, and adjust a weight of the image distance based on a photograph time interval between the first photograph and the second photograph to obtain a composite image distance, wherein a larger composite image distance indicates a lower image similarity and a smaller composite image distance indicates a higher image similarity.

As a further embodiment of the present invention, the calculation module is further configured to:

increase the weight of the image distance to increase the composite distance between the first photograph and the second photograph if the photograph time interval between the first photograph and the second photograph is longer than a first preset time; and decrease the weight of the image distance to decrease the composite distance of the first photograph and the second photograph if the photograph time interval between the first photograph and the second photograph is shorter than a second preset time.

As a further embodiment of the present invention, the calculation module is further configured to determine an image quality of the photographs in a same set;

the processing module is further configured to select the photograph with the highest quality as a set cover or a part of the set cover;

the apparatus further comprises a learning module for deep neural network training such that the learning module and the calculation module cooperatively score the photographs in the same set;

the processing module is configured to select the photograph with the highest or the lowest score as the photograph with the highest image quality and use the selected photograph as the set cover or the part of the set cover.

Compared with the prior art, the present invention has the advantages that a large quantity of similar images in a user's photo album can be efficiently sorted, and placed into the same directory to facilitate the user's management and viewing of the photographs.

DETAILED DESCRIPTION

The present application will now be described in detail in conjunction with the accompanying drawings. However, the embodiments do not necessarily limit the present invention. Modifications to the structures, the methods, or the functionalities of the embodiments, which are easily made by the ordinary skilled in the art, are included within the protection scope of the present application.

Figure 1:
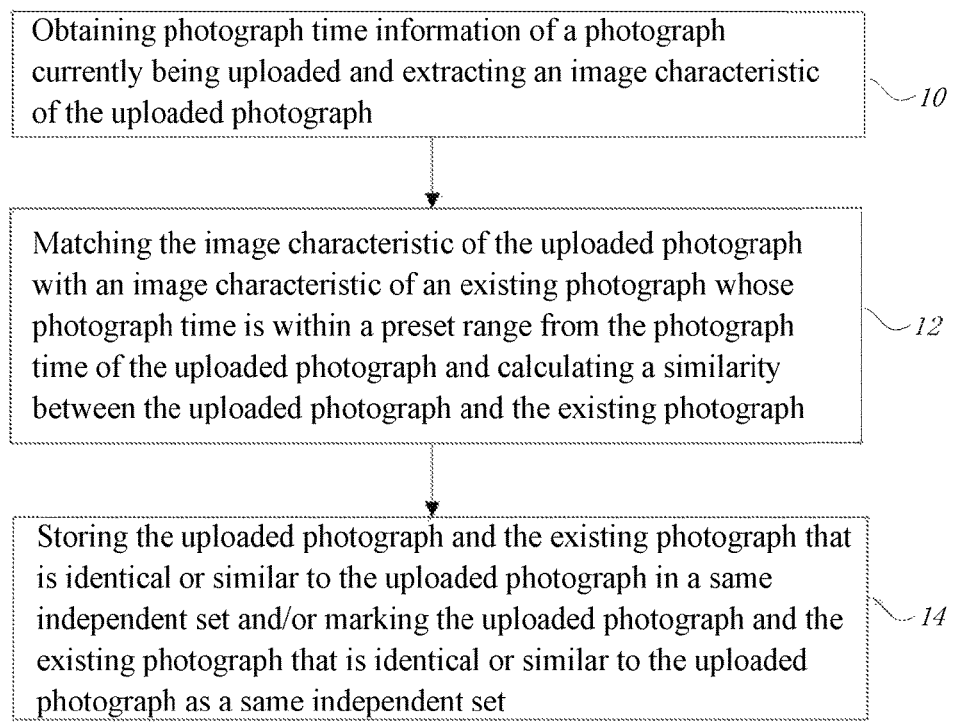
FIG. 1 is a flowchart of a method for photograph classification and storage according to a first embodiment of the present invention.

As shown in FIG. 1, according to the first embodiment, a method for photograph classification and storage includes obtaining photograph time information of a photograph currently being uploaded, and extracting an image characteristic of the uploaded photograph (10). In this embodiment, a digital photograph generally includes a photograph time when the photograph is taken. During or after a photograph is uploaded, the photograph time of the uploaded photograph is obtained and the image characteristic of the uploaded photograph is extracted. The image characteristic is a complete descriptive characteristic including the GIST characteristic, and/or the CMG (Color Moments Grid) characteristic, and/or the color histogram characteristic.

The method further includes matching the image characteristic of the uploaded photograph with the image characteristics of the existing photographs whose photograph time are within a preset range from the photograph time of the uploaded photograph, and calculating the similarity between the uploaded photograph and the existing photographs (12). In this embodiment, after the photograph time of the uploaded photograph is obtained, the existing photographs whose photograph time are within the preset range from the photograph time of the uploaded photograph are selected from a photograph database based on the photograph time.

Following photographic habits, one usually photographs a subject in the same scene repeatedly within a given time range. For example, there is a high probability that a photograph taken within 30 seconds from taking a first photograph is identical or similar to the first photograph, while it is less probable that photographs whose photograph timespan a comparatively long interval, for example 5 minutes, are taken at the same scene. By using the photograph time to select the existing photographs with higher probability to be identical or similar to the uploaded photograph, the calculation effort for the subsequent image characteristic match can be greatly decreased, the workload of the server can be reduced and the match efficiency can be improved. In addition, the image characteristics of the selected existing photographs are compared with that of the uploaded photograph to determine whether the existing photographs include photographs that are identical or similar to the uploaded photograph. In this embodiment, the image characteristic of the uploaded photograph may be compared with the image characteristic of each of the existing photographs taken within the preset time range one by one to calculate the similarity between the uploaded photograph and one or more existing photograph.

In this embodiment, calculating the image similarity includes two dimensionalities, namely, the image distance and the photograph time interval. In particular, the calculation includes calculating the image distance between the uploaded photograph and the existing photograph, and adjusting the weight of the image distance based on the photograph time interval between the uploaded photograph and the existing photograph to obtain a composite image distance, wherein the image distance may be a Cosine distance, a histogram distance, a Euclidean distance and the like. A larger composite image distance indicates a lower image similarity, while a smaller composite image distance indicates a higher image similarity.

Specifically, if the photograph time interval between the uploaded photograph and the existing photograph is longer than a first preset time (e.g. 5 minutes), the weight of the image distance is increased to increase the composite distance between the uploaded photograph and the existing photograph. If the photograph time interval between the uploaded photograph and the existing photograph is shorter than a second preset time (e.g. 30 seconds), the weight of the image distance is decreased to decrease the composite distance between the uploaded photograph and the existing photograph.

When the composite image distance is smaller than a preset threshold, the uploaded photograph is considered as identical or similar to one or more existing photograph. When the composite image distance is larger than the preset threshold, the uploaded photograph is considered as different from or dissimilar to the existing photograph.

The method further includes storing the uploaded photograph and the existing photographs that are identical or similar to the uploaded photograph in a same independent set, and/or marking the uploaded photograph and the existing photographs that are identical or similar to the uploaded photograph as a same independent set (14). In this embodiment, the uploaded photograph and the existing photographs that are identical or similar to the uploaded photograph may be stored in the same folder (subdirectory) in a directory. Alternatively, the uploaded photograph may be labeled with the same ID as that of the existing photographs which are similar to the uploaded photograph, to indicate on the front-end page that it belongs to the same folder (subdirectory) as the existing photographs, to facilitate the user's management and viewing of the photographs. If there is no existing photograph that is identical or similar to the uploaded photograph, the uploaded photograph may be stored in the root directory or in a separate folder (subdirectory) alone, and/or marked with a new ID.

In this embodiment, the method further includes: determining the image quality of the photographs in the same set, and using the photograph with the highest image quality as the set cover or a part of the set cover. Characteristics used for determining the image quality may include image sharpness, the number of persons in the image; a subjective image quality score, etc. Specifically, the method includes providing scores to the photographs in the same set using the deep neural network training. Particularly, the deep neural network training method includes:

outputting a group of two photographs at a time, and manually judging which one of the two photographs has a higher image quality, to revise the image quality scores provided by the system. After multiple groups of photographs are evaluated, a stable evaluation standard is established; and selecting the photograph with the highest or lowest score as the photograph with the highest image quality and using the photograph as the set cover or a part of the set cover. It is noted that, during the above deep neural network training, if the score of the photograph which is manually judged as having the higher image quality is revised as having the lower score, the photograph with the lowest score represents the photograph with the highest image quality. If the score of the photograph which is manually judged as having the higher image quality is revised as the higher score, the photograph with the highest score represents the photograph with the highest image quality. In addition, in this embodiment, the photograph having the highest image quality may be used as the set cover where the set cover has only one photograph; or as a part of the set cover where the set cover nay have multiple photographs.

Figure 2:
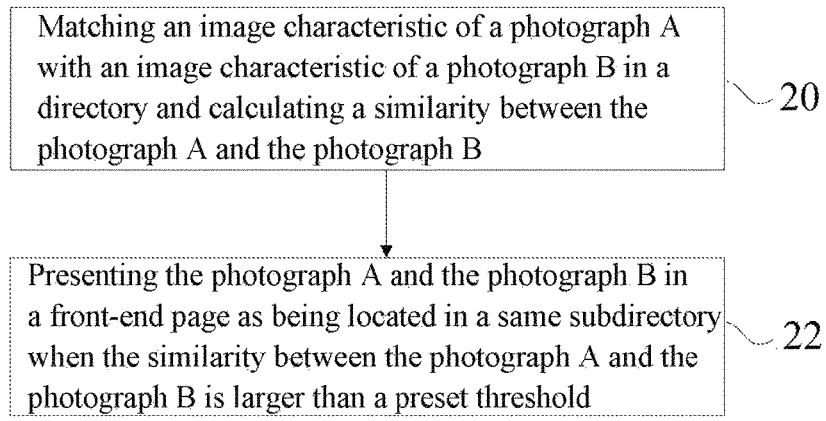
FIG. 2 is a flowchart of a method for photograph classification and storage according to a second embodiment of the present invention.

As shown in FIG. 2, according to the second embodiment of the present invention, a method for photograph classification and storage includes:

matching the image characteristic of photograph A with the image characteristic of photograph B in a directory, and calculating the similarity between the photograph A and the photograph B (20). In this embodiment, the image characteristic of the photograph is a complete descriptive characteristic that includes the GIST characteristic, and/or the CMG characteristic, and/or the color histogram characteristic. In the embodiment, the photograph B may be any photograph in the directory except the photograph A.

When the similarity between the photograph A and the photograph B is larger than a preset threshold, the photograph A and the photograph B are presented on the front-end page as being located in the same subdirectory (22). That is, if the photograph A and the photograph B are identical or similar to each other, they are stored in the same independent set and/or marked as the same independent set. In this embodiment, the photograph A and the photograph B may be stored in the same folder (subdirectory) in a directory. The photograph A and the photograph B may also be presented on the front-end page in the same folder (subdirectory) by adding the same ID to the photograph A and the photograph B to facilitate the user's management and viewing of the photographs. If there is no photograph B that is identical or similar to the photograph A, the photograph A may be stored in the root directory or a separate folder (subdirectory), and/or marked with a new ID.

In the present embodiment, matching the image characteristic of the photograph A with the image characteristic of the photograph B in the directory includes:

obtaining the photograph time information of the photographs in the directory; and obtaining a photograph time of the photograph as the digital photograph generally includes photograph time information of the photograph.

After obtaining the photograph time of the photograph, the image characteristic of the photograph A is compared with the image characteristic of the photograph B in the directory whose photograph time interval is within a preset range from the photograph time of the photograph A.

Following photographic habits, one usually photographs a subject in the same scene repeatedly within a given time span. For example, there is a high probability that a photograph taken within 30 seconds from a first photograph is identical or similar to the first photograph, while it is less probable that photographs whose photograph timespan a large time interval, for example 5 minutes, are taken in the same scene. By using the photograph time to select the existing photographs with high probability to be identical or similar to the photograph A, the calculation effort for the subsequent image characteristic match can be greatly decreased, the workload of the server can be reduced and the match efficiency can be improved. In this embodiment, the image characteristic of the photograph A may be compared one by one with the image characteristic of each of the other photographs in the directory within the preset time range to calculate the similarity between the current photograph A and one or more existing photograph. In this embodiment, the photograph B may be any photograph in the directory, which was taken at a time within a preset range from the photograph time of the photograph A.

In this embodiment, calculating the image similarity includes two dimensionalities, namely, the image distance and the photograph time interval. In particular, the calculating includes calculating the image distance between the photograph A and the photograph B, and adjusting the weight of the image distance based on the photograph time interval between the photograph A and the photograph B to obtain a composite image distance. The image distance may be a Cosine distance, a histogram distance, a Euclidean distance and the like. A larger composite image distance indicates a lower image similarity, while a smaller composite image distance indicates a higher image similarity.

Specifically, if the photograph time interval between the photograph A and the photograph B is large, longer than a first preset time (e.g. 5 minutes), the weight of the image distance is increased to increase the composite image distance between the photograph A and the photograph B. If the photograph time interval between the photograph A and the photograph B is shorter than a second preset time (e.g. 30 seconds), the weight of the image distance is decreased to decrease the composite distance between the photograph A and the photograph B.

When the composite image distance is less than the preset threshold, the image similarity between the photograph A and the photograph B is considered as larger than the preset threshold, and the photograph A is identical or similar to the photograph B. When the composite image distance is larger than the preset threshold, the image similarity between the photograph A and the photograph B is considered as less than the preset threshold, and the photograph A is different from or dissimilar to the photograph B.

In this embodiment, the method further includes:
determining the image quality of the photographs in the same set, and selecting the photograph with the highest image quality as the set cover or a part of the set cover. Characteristics used for determining the image quality may include image sharpness, the number of persons in the image, a subjective image quality score, etc. Specifically, the method includes providing scores to the photographs in the same set using the deep neural network training. Particularly, the deep neural network training method includes:
outputting a group of two photographs at a time, and manually judging which one of the two photographs has a higher image quality to revise the image quality score provided by the system. After multiple groups of photographs are evaluated, a stable evaluation standard is established; and
selecting the photograph with the highest or lowest score as the photograph with the highest image quality and using the selected photograph as the set cover or a part of the set cover. It is noted that, if the score of the photograph which is manually judged as having the higher image quality is revised as having a lower score, the photograph with the lowest score represents the photograph with the highest image quality. If the score of the photograph which is manually judged as having the higher image quality is revised as having a higher score, the photograph with the highest score represents the photograph having the highest image quality. In addition, in this embodiment, the photograph having the highest image quality may be used as the set cover where the set cover includes only one photograph; or used as a part of the set cover where the set cover may have multiple photographs.

Figure 3:
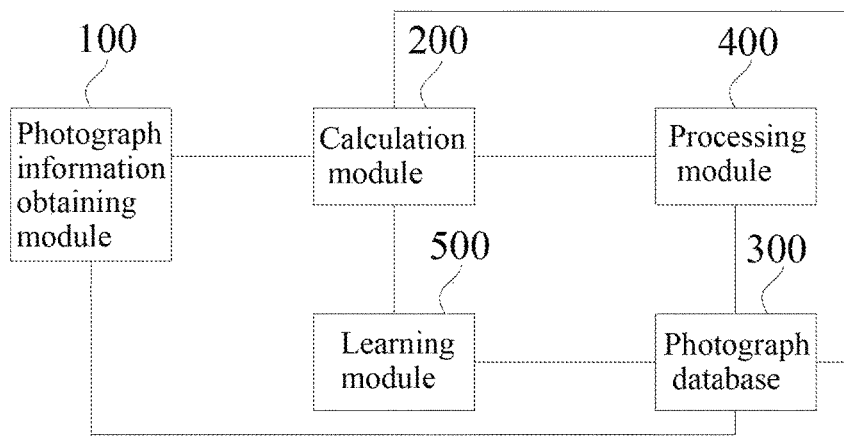
FIG. 3 is a module diagram of an apparatus for photograph classification and storage according to an embodiment of the present invention.

FIG. 3 shows a module diagram of the photograph classification and storage apparatus according to one embodiment of the present invention, which may correspond to the two different methods as described above, respectively.

When the apparatus corresponds to the first embodiment, the apparatus includes a photograph information obtaining module 100 for obtaining a photograph time of an uploaded photograph. In this embodiment, a digital photograph generally includes the photograph time when the photograph is taken, and the photograph time of the uploaded photograph is obtained during or after the photograph is uploaded.

The apparatus further includes a calculation module 200 for extracting an image characteristic of the uploaded photograph. The image characteristic is a complete descriptive characteristic including the GIST characteristic, and/or the CMG characteristic, and/or the color histogram characteristic.

The calculation module 200 is further configured to compare the image characteristic of the uploaded photograph with the image characteristic of the existing photograph whose photograph time is within a preset range from the photograph time of the uploaded photograph, and to calculate the similarity between the uploaded photograph and the existing photograph. In this embodiment, after the photograph time of the uploaded photograph is obtained, the existing photograph whose photograph time is within the preset range from the photograph time of the uploaded photograph is selected from a photograph database based on the photograph time. Both of the uploaded photograph and the existing photograph are stored in the photograph database 300.

Following photographic habits, one usually photographs a subject in the same scene repeatedly within a given time range. For example, there is a high probability that a photograph taken within 30 seconds from taking a first photograph is identical or similar to the first photograph, while it is less probable that photographs whose photograph timespan a comparatively long interval, for example 5 minutes, are taken at the same scene. By using the photograph time to select the existing photographs with high probability to be identical or similar to the uploaded photograph, the calculation effort for the subsequent image characteristic match can be greatly decreased, the workload of the server can be reduced and the match efficiency can be improved. In addition, the image characteristics of the selected existing photographs are compared with that of the uploaded photograph to determine whether the existing photographs include photographs that are identical or similar to the uploaded photograph. In this embodiment, the image characteristic of the uploaded photograph may be compared with the image characteristic of each of the existing photographs taken within the preset time range one by one to calculate the similarity between the uploaded photograph and one or more existing photograph.

In this embodiment, calculating the image similarity includes two dimensionalities, namely, the image distance and the photograph time interval. In particular, the calculation module 200 is configured to calculate the image distance between the uploaded photograph and the existing photograph, and adjust the weight of the image distance based on the photograph time interval between the uploaded photograph and the existing photograph to obtain a composite image distance. The image distance may be a Cosine distance, a histogram distance, a Euclidean distance and the like. A larger composite image distance indicates a lower image similarity, while a smaller composite image distance indicates a higher image similarity.

Specifically, if the photograph time interval between the uploaded photograph and the existing photograph is longer than a first preset time (e.g. 5 minutes), the weight of the image distance is increased to increase the composite distance between the uploaded photograph and the existing photograph. If the photograph time interval between the uploaded photograph and the existing photograph is shorter than a second preset time (e.g. 30 seconds), the weight of the image distance is decreased to decrease the composite distance between the uploaded photograph and the existing photograph.

When the composite image distance is smaller than a preset threshold, the uploaded photograph is considered as identical or similar to one or more given existing photograph. When the composite image distance is larger than the preset threshold, the uploaded photograph is considered as different from or dissimilar to the existing photograph.

The apparatus further includes a processing module 400 configured to store the uploaded photograph and the existing photographs that are identical or similar to the uploaded photograph in a same independent set and/or mark the uploaded photograph and the existing photographs that are identical or similar to the uploaded photograph as a same independent set. In this embodiment, the uploaded photograph and the existing photographs that are identical or similar to the uploaded photograph may be stored in the same folder (subdirectory) in a directory. Alternatively, the uploaded photograph may be labeled with the same ID as that of the existing photographs which are similar to the uploaded photograph to indicate on the front-end page that the uploaded photograph belongs to the same folder (subdirectory), to facilitate the user's management and viewing of the photographs. If there is no existing photograph that is identical or similar to the uploaded photograph, the uploaded photograph may be stored in the root directory or in a separate folder (subdirectory) alone, and/or marked with a new ID.

In this embodiment, the calculation module 200 is further configured to determine the image quality of the photographs in the same set. The processing module 400 is further configured to use the photograph with the highest image quality as the set cover or a part of the set cover. Characteristics used for determining the image quality score may include the image sharpness, the number of persons in the image, the subjective image quality score, etc.

The apparatus further includes a learning module 500. The learning module 500 is used for deep neural network training such that the learning module 500 and the calculating module 200 can cooperatively score the photographs in the same set.

Accordingly, the deep neural network training method includes outputting a group of two photographs at a time, and manually judging which one of the two photographs has a higher image quality, to revise the image quality scores provided by the system. After multiple sets of photographs are evaluated, a stable evaluation standard is established.

The processing module 400 selects the photograph with the highest or lowest score as the photograph having the highest image quality and uses the selected photograph as the set cover or a part of the set cover. It is noted that, during the above deep neural network training, if the score of the photograph which is manually judged as having the higher image quality is revised as having a lower score, the photograph with the lowest score represents the photograph with the highest image quality. If the score of the photograph which is manually judged as having the higher image quality is revised as a higher score, the photograph with the highest score represents the photograph with the highest image quality. In addition, in this embodiment, the photograph with the highest image quality may be used as the set cover where the set cover includes only one photograph; or as a part of the set cover where the set cover may have multiple photographs.

If the apparatus corresponds to the second embodiment as described above, the apparatus includes a calculation module 200 used to compare the image characteristic of the photograph A with that of the photograph B in the directory, and calculate the similarity between the photograph A and the photograph B. In this embodiment, the image characteristic is a complete descriptive characteristic including the GIST characteristic, and/or the CMG characteristic, and/or the color histogram characteristic. In the embodiment, the photograph B may be any photograph in the directory except the photograph A. Both the photograph A and the photograph B are stored in the photograph database 300.

The apparatus further includes a processing module 400 which is used to present the photograph A and the photograph B on the front-end page as being located in the same subdirectory when the similarity between the photograph A and the photograph B is larger than a preset threshold. That is, if the photograph A and the photograph B are identical or similar to each other, they are stored in the same independent set and/or marked as the same independent set. In this embodiment, the photograph A and the photograph B may be stored in the same folder (subdirectory) in a directory. The photograph A and the photograph B may also be presented on the front-end page as in the same folder (subdirectory) by adding the same ID to the photograph A and the photograph B to facilitate the user's management and viewing of the photographs. If there is no photograph B that is identical or similar to the photograph A, the photograph A may be stored in the root directory or a separate folder (subdirectory), and/or marked with a new ID.

In the present embodiment, the apparatus further includes a photograph information obtaining module 100 which is used for obtaining the photograph time of the photographs in the directory. A digital photograph generally includes the photograph time of the photograph, and the photograph time of the photograph is obtained during or after the photograph is uploaded.

The calculation module 200 is used for, after the photograph time of the photographs is obtained, matching the image characteristic of the photograph B in the directory, whose photograph time is in a preset range from that of the photograph A, with the image characteristic of the photograph A.

Following photographic habits, one usually photographs a subject in the same scene repeatedly within a given time span. For example, there is a high probability that a photograph taken within 30 seconds from taking a first photograph is identical or similar to the first photograph, while it is less probable that photographs whose photograph timespan a comparatively long interval, for example 5 minutes, are taken at the same scene. By using the photograph time to select the existing photographs with high probability to be identical or similar to the photograph A according to the photograph time, the calculation effort for the subsequent image characteristic match can be greatly decreased, the workload of the server can be reduced and the matching efficiency can be improved. In this embodiment, the image characteristic of the photograph A may be compared with the image characteristic of each of the other photographs in the directory within the preset time range one by one to calculate the similarity between the current photograph A and one or more existing photograph. In this embodiment, the photograph B may be any photograph in the directory, which was taken at a time within a preset range from the photograph time of the photograph A.

In this embodiment, calculating the image similarity includes two dimensionalities, namely, the image distance and the photograph time interval. In particular, the calculation module 200 is used to calculate the image distance between the photograph A and the photograph B, and adjust the weight of the image distance based on the photograph time interval between the photograph A and the photograph B to obtain the composite image distance. The image distance may be a Cosine distance, a histogram distance, a Euclidean distance and the like. A larger composite image distance indicates a lower image similarity, while a smaller composite image distance indicates a higher image similarity.

Specifically, if the photograph time interval between the photograph A and the photograph B is longer than a first preset time (e.g. 5 minutes), the weight of the image distance is increased to increase the composite distance between the photograph A and the photograph B. If the photograph time interval between the photograph A and the photograph B is shorter than a second preset time (e.g. 30 seconds), the weight of the image distance is decreased to reduce the composite distance between the photograph A and the photograph B.

When the composite image distance is smaller than the preset threshold, it is regarded that the image similarity between the photograph A and the photograph B is larger than the preset threshold and the photograph A is identical or similar to the photograph B. When the composite image distance is larger than the preset threshold, it is regarded that the image similarity between the photograph A and the photograph B is less than the preset threshold and the photograph A is different from or dissimilar to the photograph B.

In this embodiment, the calculation module 200 is further used to determine the image quality of the photographs in the same set. The processing module 400 is further used to select the photograph with the highest image quality as the set cover or a part of the set cover. Characteristics used for determining the image quality may include image sharpness, the number of persons in the image, a subjective image quality score, etc.

The apparatus further includes a learning module 500. The learning module 500 is used for the deep neural network training so that the learning module 500 and the calculating module 200 can cooperatively score the photographs in the same group.

Particularly, the deep neural network training method includes outputting a group of two photographs at a time, and manually judging which one of the two photograph has a higher image quality, to revise the image quality score provided by the system. After multiple groups of photographs are evaluated, a stable evaluation standard is established.

The processing module 400 selects the photograph with the highest or lowest score as the photograph with the highest image quality and uses the selected photograph as the set cover or a part of the set cover. It is noted that, during the above deep neural network training, if the score of the photograph which is manually judged as having the higher image quality is revised as having a lower score, the photograph with the lowest score represents the photograph having the highest image quality. If the score of the photograph which is manually judged as having the higher image quality is revised as having a higher score, the photograph with the highest score represents the photograph with the highest image quality. In addition, in this embodiment, the photograph with the highest image quality may be used as the set cover where the set cover includes only one photograph; or as a part of the set cover where the set cover may have multiple photographs.

In summary, the present invention has the advantageous effect that a large quantity of similar images in a user's photo album can be sorted efficiently and placed into the same folder to facilitate the user's management and viewing of the photographs.

A person skilled in the art can readily understand that, for the convenience and conciseness of the description, the concrete operation of the above system, apparatus and modules can refer to the corresponding operations in the foregoing method embodiments and will not be repeated here.

It should be appreciated that the system, apparatus and method disclosed in the embodiments as provided in the present invention may be implemented in other manners. For example, the apparatus embodiments described above are only illustrative. For example, the division of the modules is merely logical and functional, in practice, the division can be implemented in other fashions. For example, multiple modules or components can be combined or integrated into another system, or certain features can be ignored or not executed. In addition, cooperative coupling, direct coupling or communication connection as presented or discussed may be indirect coupling or communication connection between the ports, apparatuses or modules, and may be electrical connection, mechanical connection or connections in other forms.

The modules illustrated as separate components may or may not be physically separate and the components presented by the modules may or may not be physical modules. They can be located in one place or distributed to multiple network modules. Some or all of the modules can be selected as required to achieve the objective of the embodiments of the present invention.

In addition, the functional modules in the embodiments of the present invention may be integrated in one processing module, or may be implemented as separate physical modules, or two or more of them may be integrated in one module. The integrated modules may be implemented in a form of hardware or a combination of hardware and software functional modules.

The integrated modules implemented as software functional modules described above may be stored in a computer-readable medium. The software functional modules are stored in a storage medium which includes a number of instructions to cause a computer device (such as a personal computer, a server or a network apparatus) or a processor to execute a portion of the method steps according to the embodiments of the present invention. The foregoing storage medium includes various media that are used for storing program codes: a USB disk, a mobile hard disk, a Read-Only Memory (ROM), a Random Access Memory (RAM), a magnetic disk, an optical disk and the like.

It should be noted that the embodiments described above are merely to illustrate the technical solution of the present invention but are not to limit it. Although the present invention is illustrated in details according to the foregoing embodiments, a person skilled in the art should appreciate that modifications can be made to the technical solution recorded in the foregoing embodiments and some technical characteristics can be replaced by equivalents thereof. The modifications and replacement will not make the corresponding technical solution depart from the spirit and the scope of technical solution provided by the embodiments of the present invention.

What is claimed is:

1. A computer-implemented method for photograph classification and storage on a computer comprising a processor, the method comprising:
   obtaining, using the processor, a photograph time information of a photograph currently being uploaded;
   extracting, using the processor, at least one of a GIST characteristic or a Color Moments Grid (CMG) characteristic of the uploaded photograph;
   matching, using the processor, the at least one of the GIST characteristic or the CMG characteristic of the uploaded photograph with at least one of a GIST characteristic or a CMG characteristic of an existing photograph, wherein a photograph time of the existing photograph is within a preset range of the photograph time of the uploaded photograph;
   calculating, using the processor, a similarity between the uploaded photograph and the existing photograph;
   storing, using the processor, the uploaded photograph and the existing photograph that is either identical or similar to the uploaded photograph in a same independent set, and marking, using the processor, the uploaded photograph and the existing photograph that is either identical or similar to the uploaded photograph as a same independent set, or a combination thereof;
   providing, using the processor, a score to each photograph in a same set by using a trained deep neural network with a stable evaluation standard;

selecting, using the processor, a photograph with a highest score or a lowest score as a photograph with a highest image quality; and using the selected photograph, by using the processor, as a set cover or a part of the set cover, wherein the calculating the similarity between the uploaded photograph and the existing photograph comprises:

calculating, using the processor, a cosine distance or an Euclidean distance between the uploaded photograph and the existing photograph; and adjusting, using the processor, a weight of the cosine distance or the Euclidean distance based on a photograph time interval between the uploaded photograph and the existing photograph to obtain a composite image distance, and wherein a larger composite image distance indicates a lower image similarity and a smaller composite image distance indicates a higher image similarity.

2. The method according to claim 1, wherein the calculating the similarity between the uploaded photograph and the existing photograph further comprises:

increasing, using the processor, the weight of the cosine distance or the Euclidean distance to increase the composite image distance of the uploaded photograph and the existing photograph if the photograph time interval between the uploaded photograph and the existing photograph is comparatively long; and reducing, using the processor, the weight of the image distance to decrease the composite image distance of the uploaded photograph and the existing photograph if the photograph time interval between the uploaded photograph and the existing photograph is comparatively short.

3. A computer-implemented method for photograph classification and storage on a computer comprising a processor, the method comprising:

matching, using the processor, at least one of a GIST characteristic or a Color Moments Grid (CMG) characteristic of a first photograph with at least one of a GIST characteristic or a CMG characteristic of a second photograph in a directory;

calculating, using the processor, a similarity between the first photograph and the second photograph; and presenting, using the processor, the first photograph and the second photograph in a front-end page as being located in a same subdirectory when the similarity between the first photograph and the second photograph is larger than a preset threshold;

providing, using the processor, a score to each of the first and second photographs in a same set by using a trained deep neural network with a stable evaluation standard;

selecting, using the processor, a photograph with a highest score or a lowest score as a photograph with a highest image quality, from the first and second photographs; and using the selected photograph, by using the processor, as a set cover or a part of the set cover, wherein matching the at least one of the GIST characteristic or the CMG characteristic of the first photograph with the at least one of the GIST characteristic or the CMG characteristic of the second photograph in the directory comprises:

obtaining, using the processor, a photograph time of the photographs in the directory; and matching, using the processor, the image characteristic of the first photograph with the image characteristic of the second photograph in the directory, wherein the photograph time of the second photograph is within a preset range of the photograph time of the first photograph, wherein the calculating the similarity between the first photograph and the second photograph comprises:

calculating, using the processor, a cosine distance or an Euclidean distance between the first photograph and the second photograph; and adjusting, using the processor, a weight of the cosine distance or the Euclidean distance based on a photograph time interval between the first photograph and the second photograph to obtain a composite image distance, and wherein a larger composite image distance indicates a lower image similarity and a smaller composite image distance indicates a higher image similarity.

4. The method according to claim 3, wherein the calculating the similarity between the first photograph and the second photograph further comprises:

increasing, using the processor, the weight of the cosine distance or the Euclidean distance to increase the composite image distance of the first photograph and the second photograph if the photograph time interval between the first photograph and the second photograph is longer than a first preset time; and reducing, using the processor, the weight of the cosine distance or the Euclidean distance to decrease the composite image distance of the first photograph and the second photograph if the photograph time interval between the first photograph and the second photograph is shorter than a second preset time.

5. A photograph classification and storage apparatus, comprising:

a processor; and a memory storing instructions, which when executed by the processor, cause the processor to perform operations, the operations comprising:

obtaining photograph time information of a photograph currently being uploaded;

extracting at least one of a GIST characteristic or a Color Moments Grid (CMG) characteristic of the uploaded photograph, comparing the at least one of the GIST characteristic or the CMG characteristic of the uploaded photograph with at least one of a GIST or a CMG characteristic of an existing photograph, wherein the photograph time of the existing photograph is within a preset range of the photograph time of the uploaded photograph, and calculating a similarity between the uploaded photograph and the existing photograph;

storing the uploaded photograph and the existing photograph that is either identical or similar to the uploaded photograph in a same independent set, and marking the uploaded photograph and the existing photograph that is either identical or similar to the uploaded photograph as a same independent set, or a combination thereof;

providing a score to each photograph in a same set by using a trained deep neural network with a stable evaluation standard;

selecting a photograph with a highest score or a lowest score as a photograph with a highest image quality; and using the selected photograph as a set cover or a part of the set cover, wherein the calculating the similarity between the uploaded photograph and the existing photograph comprises:

calculating a cosine or an Euclidean distance between the uploaded photograph and the existing photograph, and adjusting a weight of the cosine or the Euclidean distance based on a photograph time interval between the uploaded photograph and the existing photograph to obtain a composite image distance, and wherein a larger composite image distance indicates a lower image similarity and a smaller composite image distance indicates a higher image similarity.

6. The photograph classification and storage apparatus according to claim 5, wherein the calculating the similarity between the uploaded photograph and the existing photograph further comprises:

increasing the weight of the cosine or the Euclidean distance to increase the composite image distance of the uploaded photograph and the existing photograph if the photograph time interval between the uploaded photograph and the existing photograph is comparatively long; and decreasing the weight of the cosine or the Euclidean distance to decrease the composite image distance of the uploaded photograph and the existing photograph if the photograph time interval between the uploaded photograph and the existing photograph is comparatively short.

7. A photograph classification and storage apparatus, comprising:

a processor; and a memory storing instructions, which when executed by the processor, cause the processor to perform operations, the operations comprising:

comparing at least one of a GIST characteristic or a Color Moments Grid (CMG) characteristic of a first photograph with at least one of a GIST characteristic or a CMG characteristic of a second photograph in a directory, and calculate a similarity of the first photograph and the second photograph;

presenting the first photograph and the second photograph in a front-end page as being located in a same subdirectory when the similarity between the first photograph and the second photograph is larger than a preset threshold;

providing a score to each of the first and second photographs in a same set by using a trained deep neural network with a stable evaluation standard;

selecting a photograph with a highest score or a lowest score as a photograph with a highest image quality, from the first and second photographs; and using the selected photograph as a set cover or a part of the set cover, wherein comparing at least one of a GIST characteristic or a CMG characteristic of a first photograph with at least one of a GIST characteristic or a CMG characteristic of a second photograph in a directory comprises:

obtaining a photograph time of the photographs in the directory, comparing the image characteristic of the first photograph with the image characteristic of the second photograph in the directory, wherein the photograph time of the second photograph is within a preset range of the photograph time of the first photograph, wherein the calculating the similarity between the first photograph and the second photograph comprises:

calculating a cosine or an Euclidean distance between the first photograph and the second photograph, and adjusting a weight of the cosine or the Euclidean distance based on a photograph time interval between the first photograph and the second photograph to obtain a composite image distance, and wherein a larger composite image distance indicates a lower image similarity and a smaller composite image distance indicates a higher image similarity.

8. The photograph classification and storage apparatus according to claim 7, wherein the calculating the similarity between the first photograph and the second photograph further comprises:

increasing the weight of the cosine or the Euclidean distance to increase the composite image distance between the first photograph and the second photograph if the photograph time interval between the first photograph and the second photograph is longer than a first preset time; and decreasing the weight of the cosine or the Euclidean distance to decrease the composite image distance of the first photograph and the second photograph if the photograph time interval between the first photograph and the second photograph is shorter than a second preset time.

* * * * *